United States Patent [19]
Iniotakis et al.

[11] Patent Number: 4,533,539
[45] Date of Patent: Aug. 6, 1985

[54] PROCESS AND ARRANGEMENT FOR THE INCREMENTAL ENRICHMENT OF DEUTERIUM AND/OR TRITIUM IN A MATERIAL SUITABLE FOR THE ISOTOPE EXCHANGE OF DEUTERIUM AND/OR TRITIUM WITH HYDROGEN

[75] Inventors: Nicolaos Iniotakis, Jülich; Claus-Benedict von der Decken, Aachen, both of Fed. Rep. of Germany

[73] Assignee: Kernforschungsanlage Jülich GmbH, Jülich, Fed. Rep. of Germany

[21] Appl. No.: 387,479

[22] Filed: Jun. 11, 1982

[30] Foreign Application Priority Data

Jun. 16, 1981 [DE] Fed. Rep. of Germany ....... 3123860

[51] Int. Cl.³ ............................................... C01B 5/00
[52] U.S. Cl. .................................... 423/648 A; 55/16; 422/159; 422/189; 423/249
[58] Field of Search ............... 423/648 A; 55/16

[56] References Cited

U.S. PATENT DOCUMENTS

| | | | |
|---|---|---|---|
| 3,789,112 | 1/1974 | Pachaly | 423/648 A |
| 3,888,974 | 6/1975 | Stevens | 423/648 A |
| 4,053,576 | 10/1977 | Fletcher | 423/579 |
| 4,126,667 | 11/1978 | Butler et al. | 423/648 A |

Primary Examiner—John Doll
Assistant Examiner—Wayne A. Langel
Attorney, Agent, or Firm—Scully, Scott, Murphy & Presser

[57] ABSTRACT

A process for the incremental enrichment of deuterium and/or tritium in a material which is suitable for the isotope exchange of deuterium and tritium with hydrogen, and an arrangement for the implementation of the process. The process and arrangement for the enrichment of deuterium and/or tritium in water which, in addition to a high transport speed for the molecules which participate in the isotope exchange, evidences a high enrichment factor for each enrichment stage and a high yield, so that at a relatively small number of stages and low energy consumption there is attainable an overall high degree of enrichment. For each enrichment stage, water containing deuterium and/or tritium is introduced into a carrier gas flow, reduced and set to a hydrogen ($H_2$) partial pressure of maximally 100 mbar. Subsequent thereto, the carrier gas flow is conveyed along the primary side of an exchange wall which is suitable for the permeation of hydrogen, along the secondary side of which there flow a further carrier gas flow which contains a material adapted for the isotope exchange of deuterium and tritium with hydrogen in the gas phase thereof. The hydrogen isotopes deuterium and/or tritium which permeate through the exchange wall, after the isotope exchange, are bonded with the material in reaction product.

15 Claims, 2 Drawing Figures

PROCESS AND ARRANGEMENT FOR THE INCREMENTAL ENRICHMENT OF DEUTERIUM AND/OR TRITIUM IN A MATERIAL SUITABLE FOR THE ISOTOPE EXCHANGE OF DEUTERIUM AND/OR TRITIUM WITH HYDROGEN

BACKGROUND OF THE INVENTION

1. Field of the Invention

The present invention relates to a process for the incremental enrichment of deuterium and/or tritium in a material which is suitable for the isotope exchange of deuterium and tritium with hydrogen, as well as to an arrangement for the implementation of the process.

The formation of deuterium, $D_2$, and tritium, $T_2$, is not only of significance for the nuclear fusion technology, in which deuterium and tritium serve as "fuels" and which are fused to helium under the output of energy. There is also known the utilization of deuterium in nuclear reactors moderated with heavy water, in which $D_2O$ is employed as the moderator. Tritium is applied in the production of the luminescent pigments, for example, for luminescent paints, as well as for components in the gas filling of fluorescent lighting tubes and in the production of lightning arresters. Moreover, tritium is employed as a target for beam modulation in particle accelerators. In addition thereto, tritium serves for the marking of chemical compounds, for example, in the field of biochemistry.

Deuterium is contained in basic hydrogen and in water with 0.015 At %; in the hydrogen overwhelmingly as HD, in water in the form of HDO. Tritium is present in basic hydrogen only in disappearingly low concentrations; however, it is obtained for instance, as a byproduct during the operation of nuclear reactor installations, particularly in heavy water reactors and high-temperature reactors, as well as during the reconditioning of spent nuclear fuel elements. Inasmuch as tritium is radioactive and is directly taken up in the bio-cycle in the form of HTO, even minute quantities of tritium which are produced during the neutralizing of nuclear reactor installations, cannot remain unnoticed. For the neutralizing of the encountered tritium it is known to enrich and bond tritium in water.

2. Discussion of the Prior Art

Different processes are known for the enrichment of deuterium or tritium in hydrogen and water hereby having reference to K. M. Mackay et al "Deuterium and Tritium", in "Comprehensive Inorganic Chemistry", Volume 1, Pergamon Press, New York, 1973, pages 77 through 84; as well as NUKEM 500, "Herkunft, Handhabung und Verbleib von Tritium" RSI-510 321/196-SR 165, Febraury 1980. For example, an enrichment is achieved through the distillation of liquid hydrogen at a temperature of about 23° K. or through the distillation of water at 70° C. and under a vacuum. Hydro-electrolysis is known as a process with a high separating factor; thereof, in the same manner as with the distillation of hydrogen, in addition to meeting increased safety demands (high degree of sealing, explosion protection), there must also be covered a significant energy demand with regard to the enriched quantity of deuterium or tritium. The last is, above all, the instance inasmuch as it is necessary to commence with a low initial concentration of deuterium and tritium in water. In addition thereto, also known are processes in which deuterium and tritium are enriched in water through an isotope exchange in the liquid phase; referring to H. J. Fiek et al, "Tritium-Anreicherung durch Isotopenaustausch zwischen Wasserstoff und Wasser, mittels hydrophoben Katalysators fuer die Kernbrennstoff-Wiederaufbereitung", Chem.-Ing.-Techn. 52, 1980, pages 892 through 895. However, the exchange speeds in such a process are relatively slow, even with the utilization of catalysts. Moreover, currently known catalysts evidence a high susceptibility to disruption.

A heavy water recovery through the utilization of ammonia, $NH_3$, is mentioned in the KWU-Report, No. 32, April 1980, page 9. The heavy water is recovered through a monothermal ammonia-hydrogen isotope exchange. In such a process, disadvantageous is the high energy demand, which is particularly generated during the employed electrolytic ammonia fission, and which is required for the subsequent ammonia synthesis. Also the yield for the exchanged deuterium remains low during an ammonia-water isotope exchange.

SUMMARY OF THE INVENTION

Accordingly, it is an object of the present invention to provide a process for the enrichment of deuterium and/or tritium in water which, in addition to a high transport speed for the molecules which participate in the isotope exchange, evidences a high enrichment factor for each enrichment stage and a high yield, so that at a relatively small number of stages and low energy consumption there is attainable an overall high degree of enrichment.

In accordance with an inventive process of the above mentioned type, for each enrichment stage, water containing deuterium and/or tritium is introduced into a carrier gas flow, reduced and set to a hydrogen ($H_2$) partial pressure of maximally 100 mbar. Subsequent thereto, the carrier gas flow is conveyed along the primary side of an exchange wall which is suitable for the permeation of hydrogen, along the secondary side of which there flow a further carrier gas flow which contains a material adapted for the isotope exchange of deuterium and tritium with hydrogen in the gas phase thereof. The hydrogen isotopes deuterium and/or tritium which permeate through the exchange wall, after the isotope exchange, are bonded with the material in the reaction product. Employed as the carrier gas on the primary side of the exchange wall is a gas which will not disruptively influence the reduction of the water, and on the secondary side a gas which will not disruptively influence the isotope exchange, for instance, an inert gas such as helium or argon. For the isotope exchange, the carrier gas flow on the secondary side is to convey along a quantity of material per unit of time which, at least for the concentration drop between the primary and secondary sides of the exchange wall required for the permeation of deuterium and/or tritium, is greater than the hydrogen quantity per unit of time flowing along the primary side in the carrier gas flow divided by the equilibrium weight constants for the reaction equation which is determining for the isotope exchange. With respect to concentration drop there is hereby to be understood the ratio of the partial pressure of the molecules HD or HT on the primary side with respect to the partial pressure of the same molecules HD or HT on the secondary side of the exchange wall. When in the added material there are to be concurrently enriched deuterium and tritium, then in this instance, for the determination of the minimum material quantity to be introduced there are to be considered the presently smaller equilibrium weight constants of the reactions determinative for the isotope exchange of deuterium with hydrogen or tritium with hydrogen. The quantity material which is to be introduced into the carrier gas flow on the secondary side is, however, to be always measured smaller than in the carrier gas flow along the primary side of the exchange wall after reduction of the water per unit of time. The reaction products which are produced through the isotope exchange with the material are conveyed off by the carrier gas from the secondary side of the exchange wall.

In an advantageous manner, in the inventive process the isotope exchange takes place primarily on the surface of the exchange wall so that, at high transport speeds of the molecules along the wall, as they occur during the gas phase, there is propagated the desired isotope exchange. Hereby, the exchange wall through which there permeate the hydrogen isotopes, serves concurrently for a separation of between the low and highly enriched gas fractions. The exchange wall evidences a catalytic effect for the atomization of the molecules. Through the setting of a hydrogen ($H_2$) partial pressure of maximally 100 mbar in the carrier gas flow on the primary side, the permeation through the exchange wall can also be maintained over lengthier operating periods. The energy required for each enrichment stage is relatively low. For the heating of the carrier gas flow there can be utilized the exothermic reaction of the water which is introduced into the carrier gas flow.

Suitable as material for the isotope exchange with the hydrogen-deuterium-tritium mixture permeating through the exchange wall is, above all, water or steam. For the isotope exchange, in addition to or in lieu of the preferably employed water, there can also be utilized, for example, ammonia, $NH_3$, or hydrogen sulfide, $H_2S$. The material which is added on the secondary side of the exchange wall for the isotope exchange then contains overwhelmingly the hydrogen isotope H so that for hydrogen, in contrast with the hydrogen isotopes deuterium and/or tritium which are to be bonded, there is produced a concentration equilibrium on both sides of the exchange wall.

During the addition of water there is formed HTO and HDO, for example, from HT and HD, pursuant to the reactions

$$HT + H_2O \rightleftharpoons HTO + H_2 \quad (1)$$

$$HD + H_2O \rightleftharpoons HDO + H_2 \quad (2)$$

wherein through an increase of the $H_2O$ partial pressure in the carrier gas there is propagated the transition of HT into HTO and of HD into HDO. For the determination of the minimum water quantity which is to be introduced into the carrier gas flow on the secondary side, there must be considered the equilibrium weight constants of both reactions; for the enrichment of tritium the equilibrium weight constants of the above-mentioned equation (1), for the enrichment of deuterium the equilibrium weight constants of the above-mentioned equation (2). When deuterium as well as the tritium are enriched in water, in this instance there would be determinative the smaller equilibrium weight constants of the equations, which determine the isotope exchange. The water quantity which is introduced into the carrier gas flow on the secondary side is, however, always to be held lower as the hydrogen quantity contained in the carrier gas flow on the primary side, in order to attain an enrichment. In the employment of water as the material for the isotope exchange in the carrier gas flowing on the secondary side, set as the operating temperature for each exchange stage is a temperature within the temperature range of between 100° and 300° C. Within this temperature range, the equilibrium weight constants for the isotope exchange with steam evidence satifactory values. The equilibrium weight constant for the isotope exchange of tritium with hydrogen at 120° C., for example, consists of about $K=3.6$, and for deuterium with hydrogen at the same temperature of about $K=2.46$. Should, for this instance, deuterium and tritium be enriched in water, then for the determination of the minimum water quantity which is to be to the carrier gas flow on the secondary side, the equilibrium weight constant for the isotope exchange between deuterium and hydrogen is determinative.

Hydrogen, $H_2$, is contained at the same partial pressure in the gas on the primary side as well as on the secondary side of the exchange wall. Thus it is not removed from the carrier gas flow on the primary side. On the secondary side of the exchange wall there are formed the reaction products set forth on the right side of the above-mentioned equations (1) and (2). The reaction products are conducted off by the carrier gas on the secondary side. The carrier gas then flows into the subsequent exchange stage as the carrier gas flow on the primary side thereof. In this exchange stage, the reaction products, upon the utilization of water for isotope exchange, in essence, with deuterium and/or tritium enriched water, are reduced in the same manner as in the first enrichment stage, so that for the hydrogen in the carrier gas there is again set a partial pressure of maximally 100 mbar. The carrier gas is then conveyed along the primary side of the exchange wall of the further enrichment stage. The hydrogen isotopes deuterium and/or tritium permeate to the secondary side of the exchange wall and already here react extensively on the surface of the exchange wall through isotope exchange with the material which is conveyed along this side of the exchange wall within the carrier gas. The reaction products are conveyed off by the carrier gas.

In further embodiments of the inventive process, the carrier gas flow on the primary side of the exchange wall and the carrier gas flow on the secondary side of the exchange wall are conducted in counterflow in order to attain the concentration differences on both sides of the exchange wall which are adequate for permeation. As the carrier gas on the secondary side there is preferred the carrier gas also flowing on the primary side of the exchange wall. The carrier gas, in this case, can be withdrawn in an advantageous manner from the carrier gas flow which flows along the primary side of the exchange wall, as soon as after permeation of the deuterium and/or tritium this flows off the exchange wall. A portion of the carrier gas flowing on the primary side is withdrawn and, with the addition of material suitable for isotope exchange, is conducted to the secondary side of the exchange wall. Through this measure there is achieved, concurrently, a pressure equilibrium on both sides of the exchange wall, up to a slight vacuum on the secondary side which essentially corresponds to the pressure loss which is produced on the primary side of the exchange wall upon the throughflow of the carrier gas through the exchange installation, as well as a temperature equilibrium between the primary and secondary side of the exchange wall. The material which causes the isotope exchange is introduced so timely into the branched off partial gas flow of the carrier gas that upon inflow of the gas to the secondary side of the exchange wall, there is present a sufficient concentration drop relative to the carrier gas on the primary side of the exchange wall. It is advantageous that the secondary carrier gas flow, subsequent the addition of the material which reacts with the hydrogen isotopes, be conducted prior to flowing through of the secondary side of the exchange wall over a catalyst which accelerates the reaction between the added material and the hydrogen isotopes, for example, over platinum-impregnated activated charcoal. Such catalysts, and those catalysts listed in the above-mentioned article in Chem.-Ing. Technik 52, 1980, page 892, can also be employed on the secondary side of the exchange surface for the acceleration of the isotope exchange. In order to yet produce the required concentration drop prior to entry of the branched-off carrier gas into the secondary side of the exchange wall, the branched-off partial flow can also be conducted over a metal oxide bed, in which the hydrogen which is carried along by the carrier gas is oxidized, before the material which causes the isotope exchange is added to the partial gas flow.

It is advantageous to undertake the setting of the desired partial pressure in each enrichment stage subsequent to the reduction of the water which is contained in the carrier gas flow on the primary side. This is particularly the case when the water-containing gas is conveyed for reduction through a metal bed, for example, through an iron granulate or copper granulate bed, in which there are produced corresponding pressure losses during through-flow. For acceleration of the desired atomization of the reduction products, the carrier gas flow on the primary side, prior to contact with the exchange wall, is yet conducted over a catalyst, in particular over metal hydride, for example $UH_3$, $UD_3$. The catalyst can be present as a solid bed catalyst or as an impregnation on the primary side of the exchange wall.

When deuterium and/or tritium are enriched in the carrier gas in water on the secondary side, it is advantageous to introduce water into the carrier gas flow on the secondary side, whose deuterium and/or tritium content corresponds to the content of the deuterium and/or tritium which is evident in the water introduced in the first enrichment stage into the carrier gas flow on the primary side.

Suitably, the carrier gas flow which flows off the primary side of the exchange wall, occasionally after withdrawal of a partial flow which is conducted to the secondary side of the exchange wall, subsequent to oxidation of the hydrogen carried along by the carrier gas and the separation of the thereby formed water, is reconveyed in a closed circuit to the inlet of the enrichment stage. In order to have to assume only minor pressure losses for the separation of the hydrogen from the carrier gas flow on the primary side, the carrier gas flow is preferably conducted along a further exchange wall which is adapted for the permeation of hydrogen, on the secondary side of which there is present an oxidizing agent for oxidation of the hydrogen which permeates through the exchange wall. As oxidizing agents there are suited, above all, oxygen or metal oxides, such as copper oxide or iron oxide. The water which is formed as the reaction product is also conducted away from the secondary side of the exchange wall by the carrier gas and separated out through condensation. A portion of this water can be utilized on the secondary side of the exchange wall as the material which is suitable for the isotope exchange. In this instance however for the recovery of deuterium and/or tritium only the half of the quantity of water which contains deuterium and/or tritium is usable which, in the employment of the output water is also usable as material for the isotope exchange on the secondary side of the exchange wall. As output water there is herein identified the water containing the deuterium and/or tritium which, in the first enrichment stage, is conveyed into the carrier gas flow flowing on the primary side of the exchange wall.

In a further embodiment of the invention provision is made in that at least a portion of the carrier gas which flows off from the primary side of the exchange wall is employed in the subsequent stage for the setting of the hydrogen partial pressure, after separation out of the hydrogen carried along therewith. The hydrogen-free carrier gas is suitably conveyed in a closed flow circuit in which the conveying aggregates for the carrier gas flow are presently arranged in the hydrogen-free portion of the flow circuit.

BRIEF DESCRIPTION OF THE DRAWINGS

Hereinbelow there is elucidated in greater detail the inventive process and an arrangement for the implementation of the process on the basis of exemplary embodiments.

DETAILED DESCRIPTION

Figure 1:
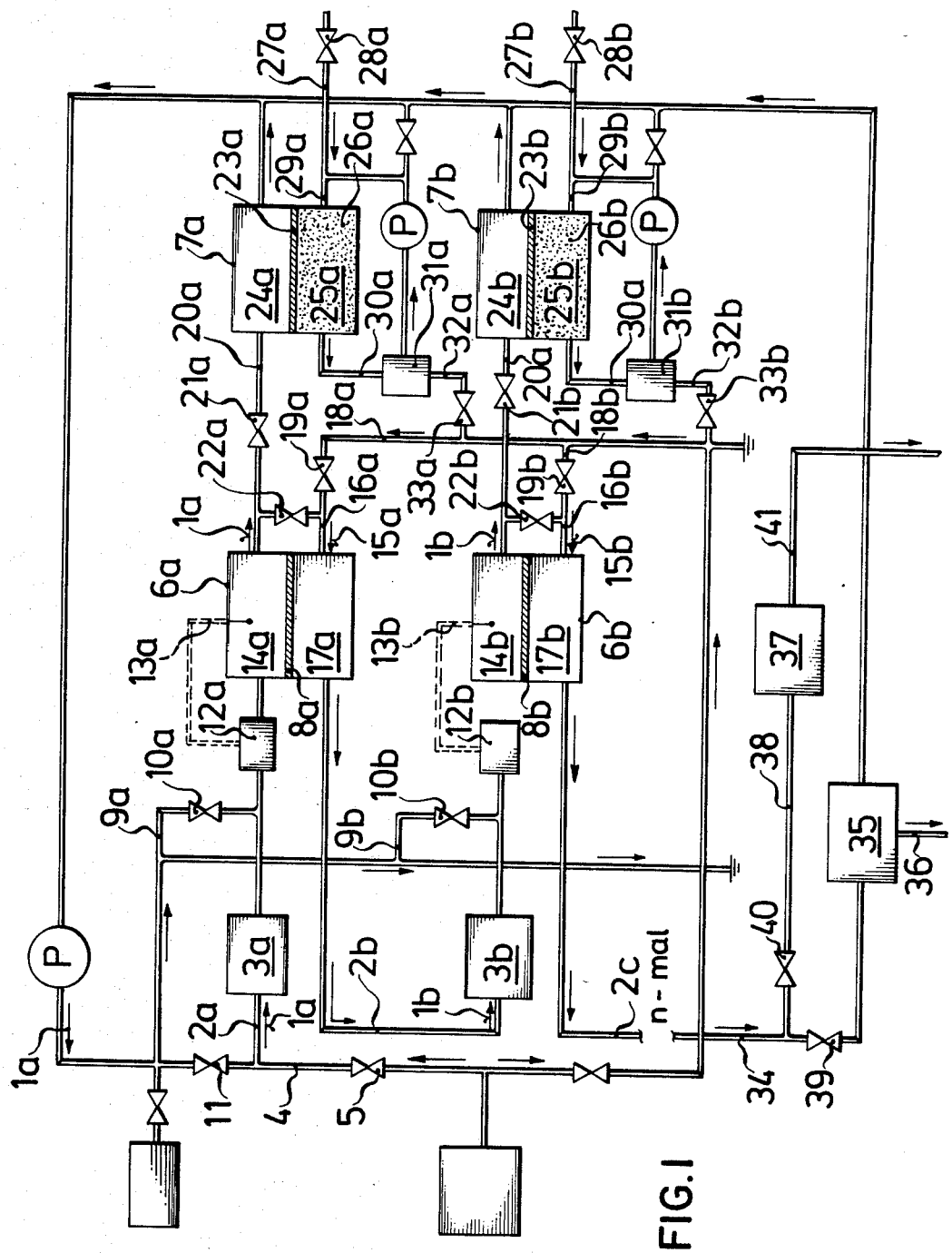
FIG. 1 of the drawings schematically illustrate an installation for the enrichment of deuterium and/or tritium in water or steam, with at least two enrichment stages to which, however, in accordance with the desired degree of enrichment, there can be connected additional enrichment stages by basically the same construction.

In the drawings, installation components which are constructed identically or the same manner and which are employed in each of the enrichment stages, are identified by the same reference numerals. For recognition of the individual enrichment stages, these reference numerals are provided with suffix letters for the installation components which characterize the therewith associated enrichment stage. For the first enrichment stage the reference numerals include the suffix "a", for the second enrichment stage the suffix "b", and so forth.

As can be ascertained from the drawings, and particularly FIG. 1, each enrichment stage of the installation includes connected in sequence in the flow direction 1a, 1b, of a carrier gas flow conveyed in an inlet conduit 2a, 2b, 2c for the third enrichment stage, not shown in the drawings, a reduction chamber 3a, 3b, for water which is contained in the carrier gas flow, which in the first enrichment stage is introduced through an inlet conduit 4 having a throughflow regulator 5 into the carrier gas flow, an exchange installation 6a, 6b for isotope exchange between deuterium and/or tritium and hydrogen, as well as an oxidation chamber 7a, 7b for the hydrogen which is carried along by the carrier gas flow from the exchange installation 6a, 6b. Each exchange installation 6a, 6b is constructed similar to a heat exchanger. Thus, there can be utilized apparatuses, for example, of the type of a bundled tube heat exchanger in which, for instance, there are employed coiled tubes, or a type of plate heat exchangers with flat or corrugated walls. The structural units which otherwise serve for heat exchange, in the exchange installations provide exchange walls for the permeation of the hydrogen isotopes. In the drawings, the exchange walls are shown merely schematically and designated with reference numerals 8a, 8b. In conformance with their purpose, the exchange walls are constituted of a material with high degree of permeability for hydrogen, in the exemplary embodiment the exchange walls are constructed of palladium or palladium-silver (approximately 75% Pd, 25% Ag). However, also adapted as material for the exchange walls are palladium-coated Nb, Ta, V as well as alloys of these metals or also interconnected metal coatings.

Into each of the exchange installations 6a, 6b after reduction in the reduction chamber 3a, 3b of the water which is introduced together with the carrier gas, a hydrogen/deuterium/tritium gas mixture is introduced into the carrier gas flow. The hydrogen partial pressure in the carrier gas which is provided for the permeation of the hydrogen isotopes is set subsequent to the reduction of the water by the introduction of further carrier gas through carrier gas conduit 9a, 9b with throughflow regulators 10a, 10b and 11. In order to maintain throughout optimum conditions for the permeation of the hydrogen isotopes through the exchange wall even over lengthier operating periods, the partial pressure for hydrogen is set so as not to exceed 100 mbar. As the operating temperature, there is provided in the exchange installation a temperature within the temperature range of about 100° to 300° C. For the heating of the carrier gas there serves a heater 12a, 12b which is controlled by a thermostat 13a, 13b in the exchange installation 6a, 6b. The heating of the carrier gas is effected through the utilization of the heat generated during the reduction of the water in the reduction chamber 3a, 3b as a result of exothermal processes.

In order to not inhibit the transport of the molecules to the surface of the exchange wall, and for limiting the quantity of the carrier gas which is to be circulated it is purposeful to operate at a pressure of between 1 and 5 bar. At a higher pressure, required in the exchange installation are larger exchange surfaces, as well as measures for the sealing of the installation.

The carrier gas is conducted within flow spaces or chambers 14a, 14b, which are respectively arranged on the primary side of the exchange wall 8a, 8b, along the exchange wall. On the secondary side of the exchange wall 8a, 8b, a further carrier gas flow flows through the exchange installations in counterflow direction 15a, 15b relative to that of the carrier gas on the primary side. The carrier gas on the secondary side is introduced through a gas conduit 16a, 16b into the flow spaces 17a, 17b of the exchange installation. In the illustrated embodiment, helium is provided as the carrier gas on the primary side as well as on the secondary side. However, other inert gases can be employed as the carrier gas, in particular argon.

In the flow space 17a, 17b of the exchange installation 16a, 16b, in each exchange stage water or steam is contained in the carrier gas, which is introduced into the carrier gas flow by means of a water or steam conduit 18a, 18b having throughflow regulator 19a, 19b therein. When water is introduced into the carrier gas flow, then this must be vaporized still ahead of the entry of the carrier gas into the flow space 17a, 17b on the secondary side of the exchange installation. The steam reacts in the flow space 17a, 17b already extensively on the surface of the exchange wall with the hydrogen isotopes deuterium and/or tritium which permeate from the primary side of the exchange wall 8a, 8b through isotope exchange. Deuterium and/or tritium leave the surface of the exchange wall on the secondary side overwhemingly as HDO and D$_2$O, or relatively HT on T$_2$O molecules, and only in a neglible low proportion as HD, D$_2$, or HT, T$_2$ molecules. The quantity of water which is to be conveyed along for this purpose by the carrier gas flow per unit of time, pursuant to the mass conversion law, is to be dimensioned correspondingly larger by at least by the concentration drop required for the permeation of deuterium and/or tritium between the primary and secondary sides of the exchange wall 8a, 8b, than the hydrogen (H$_2$) quantity per unit of time flowing on the primary side in the inert gas flow, divided by the equilibrium weight constants of the reaction equation determinative of the desired isotope exchange between deuterium and/or tritium. The quantity of water is, however, to be set smaller than the hydrogen quantity conducted along per unit of time in the carrier gas flow on the primary side of the exchange wall, in order to achieve an enrichment. Within these limits, the quantity of water is variable, whereby the concentration drop which propagates the permeation between the primary and secondary sides of the exchange wall is the higher, the more water is introduced into the carrier gas flow. There is thus required an optimization, since with an increasing quantity of water there will drop off the attainable degree of enrichment. The reaction products which are obtained during isotope exchange are conveyed off by the carrier gas from the secondary side of the exchange wall.

For the formation of the carrier gas flow on the secondary side of the exchange wall, in the illustrated embodiment a portion of the carrier gas flowing off from the primary side of the exchange wall is branched off in an exhaust discharge gas conduit 20a, 20b. Serving for the adjustment of the partial gas flow are throughflow regulators 21a, 21b in the outlet gas conduit 20a, 20b as well as throughflow regulators 22a, 22b which are provided in the gas conduit 16a, 16b, ahead of the connection of these with the exhaust gas conduit 20a, 20b. The adjustment of the branched-off partial gas quantity influences the concentration of the steam in the carrier gas flow on the secondary side. From the bypass factor, which indicates the relationship of the mass throughput of the carrier gas on the secondary side of the exchange wall relative to the mass throughput of the carrier gas on the primary side, the steam concentration which is to be set is dependent inversely proportional. The steam concentration, (H$_2$O), in the carrier gas flow on the secondary side is obtained during enrichment of deuterium with consideration given to the previously-mentioned reaction equation (2) and a yield of almost 100% from $$[H_2O] = \zeta_D \cdot \frac{[H_2O]}{\alpha \cdot K(2)}$$

wherein
  $\xi_D$ = concentration drop off HD (HD partial pressure on the primary side relative to HD partial pressure on the secondary side),
  [H$_2$] = hydrogen concentration in the carrier gas flow on the primary side, α = bypass factor (carrier gas-mass throughput on the secondary side relative to the carrier gas mass through-put on the primary side, $K_{(2)}$ = equilibrium weight constants for the reaction equation (2).

The carrier gas flow which remains in the discharge conduit 20a, 20b subsequent to the withdrawal of the partial gas flow, is introduced into the oxidation chamber 7a, 7b, in which there is oxidized the hydrogen ($H_2$) which is still carried along by the carrier gas flow after separation of deuterium and/or tritium from the hydrogen/deuterium/tritium mixture. In this embodiment, the oxidation chamber 7a, 7b is contained analogous to the exchange installation 6a, 6b and, in the same manner, incorporates exchange walls which are suitable for the permeation of hydrogen. Along these exchange walls, which are merely schematically illustrated in the drawing and which are identified by reference numerals 23a, 23b, the carrier gas flow is conducted on the primary side of the oxidation chamber within its in flow spaces 24a, 24b. The hydrogen permeates out of the carrier gas through the exchange walls 23a, 23b and is bound on the secondary side of each exchange wall through oxidation. As the oxidation medium, in the embodiment, there is provided within the flow spaces 25a, 25b, a metal oxide bed 26a, 26b, for example, a granulate bed of copper oxide or iron oxide which, during reaction with the permeating hydrogen, is reduced with the formation of water. The metal oxide bed 26a, 26b is recognizable in drawing by the stippling of the flow spaces 25a, 25b. For the oxidation of the permeated hydrogen, each flow space 25a, 25b can also have oxygen introduced thereto through an oxygen conduit 27a, 27b with throughflow regulator 28a, 28b. In general, however, the hydrogen is oxidized in the oxidation chamber 7a, 7b on metal oxide or through the introduction of oxygen into the flow space 25a, 25b. The oxidation chamber 7a, 7b with the exchange walls 23a, 23b affords advantages above all, with respect to the flow resistances which are to be considered during the flowing through of the carrier gas. These are of minor significance, when the oxidation of the hydrogen carried along by the carrier gas can also be attained, for example, through conduction of the carrier gas on the primary side into a metal oxide bed. The water formed thereby is conducted off.

In the illustrated embodiment, connected to the oxidation chamber 7a, 7b for the infeed and outlet of the carrier gas which conveys off of the oxidation products from the secondary side of the exchange wall 23a, 24b are, on the one hand, an inlet conduit 29a, 29b for carrier gas and a discharge conduit 23a, 30b for the carrier gas which is charged with the reaction products. The carrier gas flow on the secondary side of the exchange wall is conveyed in counterflow to the carrier gas flowing on the primary side of the exchange wall. The outlet conduit 30a, 30b connects into a condenser 31a, 31b in which the carried along water is condensed and withdrawn through a condensate conduit 32a, 32b. In the embodiment, the condensate conduit 32a, 32b is connectable with water or steam conduit 18a, 18b. By means of the through flow regulator 33a, 33b there can be readily regulated the quantity of water which is introduceable from the condenser 31a, 31b into the water or steam conduit 18a, 18b.

Figure 2:
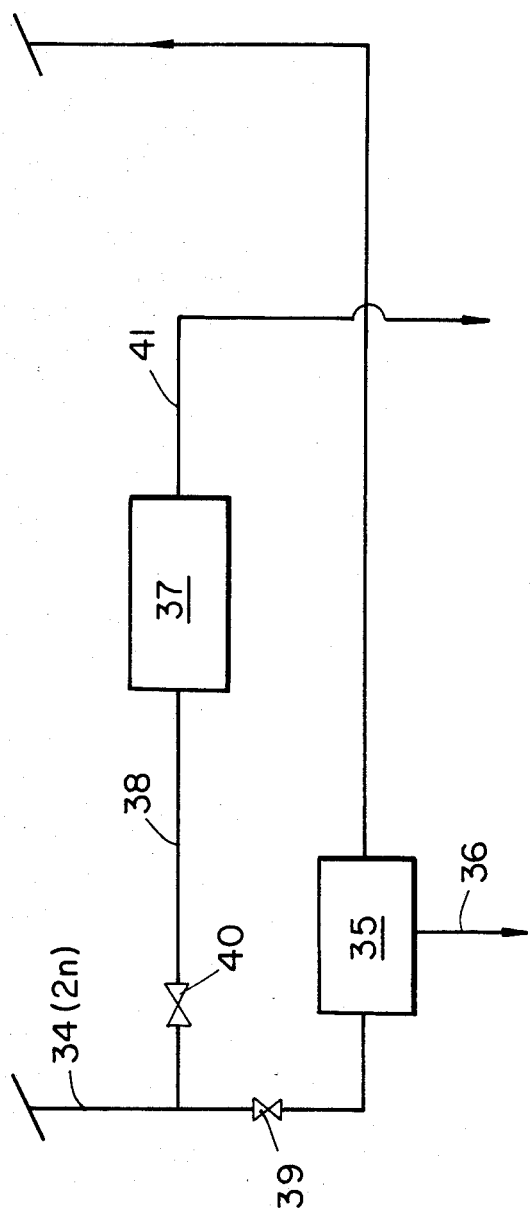
FIG. 2 illustrates a portion of the installation including the condenser and reduction chamber section.

When the desired enrichment of deuterium and/or tritium is achieved through isotope exchange in a plurality of sequentially connected enrichment stages (n-times), as shown in FIG. 2, then the carrier gas withdrawn from the last enrichment stage on the secondary side of the exchange wall, is introduced through an outlet conduit 34 into a condenser 35. In the condenser 35 there is condensed the water which is enriched with deuterium and/or tritium, and discharged through the condensate conduit 36. For the formation of an enriched hydrogen/deuterium/tritium gas mixture, a connecting conduit 38 is connected to the outlet conduit 34, which also leads to a reduction chamber 37. Thus, after the closing of a valve 39 at the inlet to the condenser 39 and after the opening of a valve 40 in the connecting conduit 38, the carrier gas can be introduced into the reduction chamber 37 in which, for example, in a metal granulate bed which reduces the water, there is formed a hydrogen/deuterium/tritium gas mixture which is highly enriched with deuterium and/or tritium, and which is dischargeable through a gas conduit 41.

The formed highly enriched water, or the formed hydrogen/deuterium/tritium gas mixture, for further enrichment and for recovery of deuterium and/or tritium can be conducted, for example, to installations for water electrolysis or for catalytic isotope exchange, for example, to isotope exchange on platinum. These known processes are presently economically applicable, since it is possible to proceed from a product with a higher deuterium and/or tritium concentration.

When during operation of the described installation there is introduced into a carrier gas flow which is conveyed to the first enrichment stage on the primary side of a total of 2.5 kg helium per second (this amount relates to the total helium which is introduced into the exchange installation 6a) through the inlet conduit 4, a quantity of water of 0.56 kg/sec ≙ 2.02 t/h, then in the carrier gas on the primary side of the exchange wall 8a, at an almost complete conversion during the reduction of the water, there will set itself a hydrogen ($H_2$) partial pressure of 46.2 mbar. The exchange wall of the first enrichment stage is so designed that approximately 97% of the deuterium and/or tritium contained in the carrier gas flow on the primary side will permeate to the secondary side. In the exchange installation, on both sides of the exchange wall there is set an overall pressure of about 1 bar and a temperature of 120° C. These operating conditions are in effect for all enrichment stages of the enrichment installation. For the take up of the permeated hydrogen isotopes, there flows along the secondary side of the exchange wall a carrier gas flow of 0.25 kg/sec of helium (bypass factor of the first enrichment stage $\alpha_a = 0.1$). The carrier gas flow contains a quantity of water of 0.277 kg/sec ≙ 1 t/h. When this water is entirely removed from the condensate water which is recovered in the oxidation chamber 7a, then in the first enrichment stage of the exchange installation 6a, there is set in the carrier gas flowing off on the secondary side, at a 97% yield for $D_2O$ and HDO, a partial pressure of 66.4 μbar. Obtained thereby is a degree of enrichment S for deuterium in the first enrichment stage of S = 2. When the carrier gas on the secondary side of the exchange wall has added thereto water with a deuterium and/or tritium content for the isotope exchange, which corresponds to the deuterium and/or tritium content of the water conveyed into the carrier gas flow on the primary side of the first enrichment stage (this deuterium and/or tritium content is hereinbelow designated as output quality), then there will set itself in the carrier gas on the secondary side of the exchange wall, at the same yield for $D_2O$ and HDO, a partial pressure of 99.6 μbar. This corresponds to a degree of an enrichment of S=3. For the tritium component in the carrier gas, under the same preconditions, in the case of a utilization of condensate water from the oxidation chamber, there is achieved a degree of of S=3, with the utilization of water of output quality, a degree of enrichment of S=4. As degree of enrichment there is hereby to be understood the ratio of deuterium and/or tritium partial pressure, (D) or (T), relative to the overall partial pressure of the hydrogen isotopes at the output on the secondary side of the exchange installation of the "i" exchange stage, designation $A_i$, to the deuterium tritium partial pressure (D) or (T), relative to the overall partial pressure of the hydrogen isotopes at the input on the primary side of the exchange installation of the first enrichment stage, designation Ao. As the degree of enrichment there is thus obtained for Deuterium $$S_D = \left( \frac{[D]}{[H] + [D]} \right) A_i : \left( \frac{[D]}{[H] + [D]} \right) A_o.$$

and for tritium $$S_T = \left( \frac{[T]}{[H] + [T]} \right) A_i : \left( \frac{[T]}{[H] + [T]} \right) A_o.$$

In the calculation of the partial pressure for deuterium and tritium in the first enrichment stage which is set through isotope exchange there is commenced from a yield of 97%. To be understood as yield is the quantity of deuterium or tritium bound in water through isotope exchange in the carrier gas flow on the secondary side relative to the quantity of deuterium or tritium in the water introduced to the primary side of the first enrichment stage. The remaining 3% of the recoverable deuterium or tritium remain in the carrier gas conveyed off on the primary side and are conducted off in the oxidation chamber during oxidation of the hydrogen.

From the first enrichment stage, a carrier gas flows to the second enrichment stage with a quantity of water of 0.277 kg/sec ≙ 1 t/h. This water is conveyed in the reduction chamber 3b into a hydrogen/deuterium/tritium gas mixture. Thereafter, through the addition of further carrier gas by means of the carrier gas conduit 9b connecting downstream of the reduction chamber 3b, the carrier gas flow is set to 2.5 kg helium/sec. Obtained therewith for the hydrogen (H$_2$) partial pressure is a value of 23.1 mbar, as well as, corresponding to the degree of enrichment achieved in the first enrichment stage, a deuterium (D$_2$, HD) partial pressure of 6.64 μbar for the instance of an enrichment with condensate water from the oxidation chamber, relatively a deuterium (D$_2$, HD) partial pressure of 9.96 μbar for the enrichment with the utilization of water of output quality in the carrier gas on the secondary side. In the same manner, the tritium content corresponds to the degree of enrichment achieved in the first stage, whereby upon the utilization of condensate water there will set a lower partial pressure, and with the utilization of water of output quality, a higher partial pressure.

The exchange installation 6b of the second enrichment stage includes, in the same manner as the exchange wall of the first enrichment stage, a measured exchange wall 8b. The obtainable yield in the second enrichment stage consists of 99%. For the formation of the carrier gas flow which flows on the secondary side of the exchange wall 8b, in the second enrichment stage there is set a bypass factor of $\alpha_b = 0.05$. Introduced into this carrier gas flow on the secondary side is a quantity of water of 0.15 kg/sec ≙ 0.54 t/h. When, for this purpose, there is employed a condensate water from the oxidation chamber 7b, then at the end of the second enrichment stage there is set for deuterium a degree of enrichment of $S_D = 3.7$; when the carrier gas flow on the secondary side has introduced therein water of output quality, for the deuterium there is then obtained a degree of enrichment of $S_D = 6.59$. For the tritium component there is obtained, in the second enrichment stage, a degree of enrichment of $S_T = 8.35$ in the utilization of condensate water from the oxidation chamber, if $S_T = 12.2$ upon the utilization of water of output quality.

The carrier gas now flows to the exchange installation of the third stage with only a water quantity of 0.54 t/h. The exchange surface which is required for the permeation of the hydrogen isotopes can hereby be reduced by about 30% at a yield rising to 99.5%. At a constant remaining carrier gas flow of 2.5 kg helium/sec. and a bypass factor of $\alpha_c = 0.05$, there is introduced into the carrier gas flow which is conducted to the secondary side of the exchange wall of the third enrichment stage, additionally 0.076 kg/sec ≙ 0.272 t/h of water. Obtained at the outlet of third stage for deuterium is a degree of enrichment of $S_D = 7.35$ upon the utilization of condensate water from the oxidation chamber; of $S_D = 14$ with the utilization of water with output quality. For tritium there are obtained degrees of enrichment, under the same preconditions, in the first instance of $S_T = 25$, in the second instance of $S_T = 48$.

In the seventh enrichment stage the quantities of water which are to be carried along in the carrier gas flow are now quite minute. The required exchange walls can hereby be so correlated that, during permeation of the hydrogen isotopes through the exchange wall, there are obtainable yields of approximately 100%. In the seventh exchange stage, the carrier gas flow on the secondary side has introduced thereto only 17.1 kg water/h. At the outlet of this stage there is obtained for deuterium a degree of enrichment of $S_D = 118$ upon the utilization of condensate water from the oxidation chamber, and an enrichment factor $S_D = 237$ upon the utilization of water of output quality. In last instance, found in the deuterium content of a total of 4 t of water; water of output quality of 17.1 kg water. After the twelfth enrichment stage, obtained for deuterium is a degree of enrichment of $S_D = 2.711$ and, respectively, 3.620. After the twelfth enrichment stage, there are only to be further processed 0.453 kg water/h.

The inventive enrichment process for deuterium and/or tritium in water can also be utilized in an advantageous manner for the elimination of tritium-containing water, which is encountered during the cooling gas purification of high temperature nuclear reactor installations and during the reconditioning of fuel elements. The water which is removed from a cooling gas cleaning installation is then introduced directly into the carrier gas flow conducted to the primary side of the first enrichment stage, as well as being introduced into the carrier gas flow on the secondary side as the material for the isotope exchange. As is shown hereinabove, in an installation having a plurality of enrichment stages there can be obtained a concentration of the tritium in water which is withdrawn from the cooling gas through the gas cleaning installation, wherein the quantity of water with the radioactive impurities which is to be finally stored water quantity, is to be reduced by the degree of enrichment. The described enrichment installation can be preferably employed in connection with an arrangement for the separation of hydrogen and/or deuterium and tritium from a cooling gas flow from high temperature reactor installations, which is described in the presently pending German Patent Application No. P 31 21 125.9. This arrangement includes gas cleaning chambers which are arranged directly in the primary cooling gas circuit, and are equipped as are the exchange devices of the hereindescribed enrichment installation, with exchange walls adapted for the permeation of hydrogen. Withdrawn from the gas cleaning chambers is a carrier gas flow which contains deuterium and/or tritium removed from the cooling gas circuit of the nuclear reactor installation in an oxidized form. This carrier gas flow can be introduced directly into the reduction chamber of the first stage of the inventive enrichment installation.

What is claimed is:

1. A process for the incremental enrichment of deuterium and/or tritium in a material adapted for the isotope exchange of deuterium and tritium with hydrogen, comprising introducing and reducing water containing deuterium and/or tritium in a carrier gas flow while setting a hydrogen ($H_2$) partial pressure of maximum 100 mbar in the carrier gas flow; thereafter conveying the carrier gas flow along the primary side of an exchange wall adapted for the permeation of hydrogen; conveying a further carrier gas flow along the secondary side of said exchange wall, said further carrier gas flow containing the material adapted for the isotope exchange in the gas phase thereof; said process being conducted under such conditions as to induce said isotope exchange as a result of permeation through said exchange wall and to enrich the carrier gas on the secondary side with deuterium and/or tritium, and conducting off reaction products from the carrier gas on the secondary side formed subsequent to the isotope exchange of deuterium and/or tritium with hydrogen.

2. Process as claimed in claim 1, wherein the material for the isotope exchange in the carrier gas flow on the secondary side comprises water or steam.

3. Process as claimed in claim 1 or 2, comprising setting a temperature for the isotope exchange in the temperature range of between 100° and 300° C.

4. Process as claimed in claim 1, comprising conveying the carrier gas flow along the secondary side of the exchange wall in counterflow with the carrier gas flow along the primary side of the exchange wall.

5. Process as claimed in claim 1, comprising utilizing the same carrier gas on the primary side and on the secondary side of the exchange wall.

6. Process as claimed in claim 5, comprising branching off a portion of the carrier gas flow from the primary side of the exchange wall, adding said material for the isotope exchange to said branched off carrier gas flow, and conveying said carrier gas flow portion to the secondary side of the exchange wall.

7. Process as claimed in claim 1, comprising conducting the carrier gas flow on the secondary side over a catalyst subsequent to the addition of the material for the isotope exchange but preceding passing through the secondary side of the exchange wall, said catalyst accelerating the reaction between the material added and the hydrogen isotopes contained in the carrier gas flow on the secondary side.

8. Process as claimed in claim 7, comprising introducing the catalyst on the secondary side of the exchange wall.

9. Process as claimed in claim 1, comprising conducting the secondary carrier gas flow over a metal oxide preceding the addition of the material for the isotope exchange.

10. Process as claimed in claim 1, comprising adjusting the hydrogen ($H_2$), partial pressure in the carrier gas flow on the primary side subsequent to reduction of the water contained in the carrier gas.

11. Process as claimed in claim 1, comprising conducting the carrier gas flow on the primary side ahead and in the region of the exchange wall over a catalyst accelerating the atomization of the reduction products.

12. Process as claimed in claim 1, comprising introducing water into the carrier gas flow on the secondary side adapted as the material for the isotope exchange, the content of deuterium and/or tritium in the water corresponding to the content of deuterium and/or tritium which is contained in the water introduced in the first enrichment stage on the primary side into the carrier gas flow.

13. Process as claimed in claim 1, comprising reconveying the carrier gas flow streaming off the primary side of the exchange wall, subsequent to oxidation of the hydrogen carried along by the carrier gas and the separation of the water formed thereby, in a closed circuit to the inlet of the enrichment stage.

14. Process as claimed in claim 13, comprising conveying the carrier gas on the primary side of an exchange wall adapted for the permeation of hydrogen, a material adapted for the oxidation of the permeating hydrogen being provided on the secondary side of the exchange wall, and conducting off the reaction products formed on the secondary side by a further carrier gas flow.

15. Process as claimed in claim 13 or 14, comprising introducing the hydrogen-free carrier gas for adjustment of the hydrogen $H_2$ partial pressure into the carrier gas flow on the primary side subsequent to reduction of the water contained in the carrier gas.

* * * * *